(12) United States Patent
Barbier et al.

(10) Patent No.: US 6,557,412 B1
(45) Date of Patent: May 6, 2003

(54) NON-FOULING LIQUID LEVEL CONTROL

(76) Inventors: William J. Barbier, 6720 Christina Maria La., Hazelwood, MO (US) 63042; Mark W. Doane, 137 Regency Pl., Millstadt, IL (US) 62260

( * ) Notice: Subject to any disclaimer, the term of this patent is extended or adjusted under 35 U.S.C. 154(b) by 7 days.

(21) Appl. No.: 09/961,891

(22) Filed: Sep. 24, 2001

Related U.S. Application Data

(60) Provisional application No. 60/293,792, filed on May 25, 2001, provisional application No. 60/256,255, filed on Dec. 18, 2000, provisional application No. 60/249,316, filed on Nov. 17, 2000, and provisional application No. 60/242,206, filed on Oct. 23, 2000.

(51) Int. Cl.[7] ............................................. G01F 23/38
(52) U.S. Cl. ..................... 73/313; 340/623; 340/624; 73/313; 73/315; 73/322.5
(58) Field of Search ............................. 73/313, 322.5, 73/315; 340/623, 624; 250/231 SE

(56) References Cited

U.S. PATENT DOCUMENTS

| | | | |
|---|---|---|---|
| 3,555,904 A | * | 1/1971 | Lenker .......................... 73/319 |
| 4,804,944 A | * | 2/1989 | Golladay et al. ........... 340/624 |
| 4,970,896 A | * | 11/1990 | Larson et al. ................. 73/313 |
| 5,103,648 A | | 4/1992 | Barbier |
| 5,136,884 A | * | 8/1992 | Lovett .......................... 73/313 |
| 5,911,289 A | | 6/1999 | Waller |
| 6,125,642 A | | 10/2000 | Seener |
| 6,253,611 B1 | * | 7/2001 | Varga et al. .................. 73/319 |

OTHER PUBLICATIONS

MELEXIS: D4–50; 3–34; 87 Applications and Databook.

* cited by examiner

Primary Examiner—Daniel S. Larkin
Assistant Examiner—André Jackson
(74) Attorney, Agent, or Firm—Daniel Kramer

(57) ABSTRACT

A non-fouling liquid level detector and control especially for a sealed system likely to have iron particle contaminants. The device employs a float projecting above the liquid level and bearing above the liquid level a unmagnetized ferromagnetic tell-tale. A magnetic field is generated by a magnet positioned outside the sealed system. The magnetic field extends around the float and tell-tale through a magnetically permeable partition comprising a wall of the sealed system that is positioned between the magnet and the float. The float position is monitored by a magnetic field sensor such as a Hall Effect device positioned adjacent the magnet, outside the sealed system. The sensor responds to the movement of the tell-tale. The output of the sensor is employed to control the monitored liquid level.

24 Claims, 6 Drawing Sheets

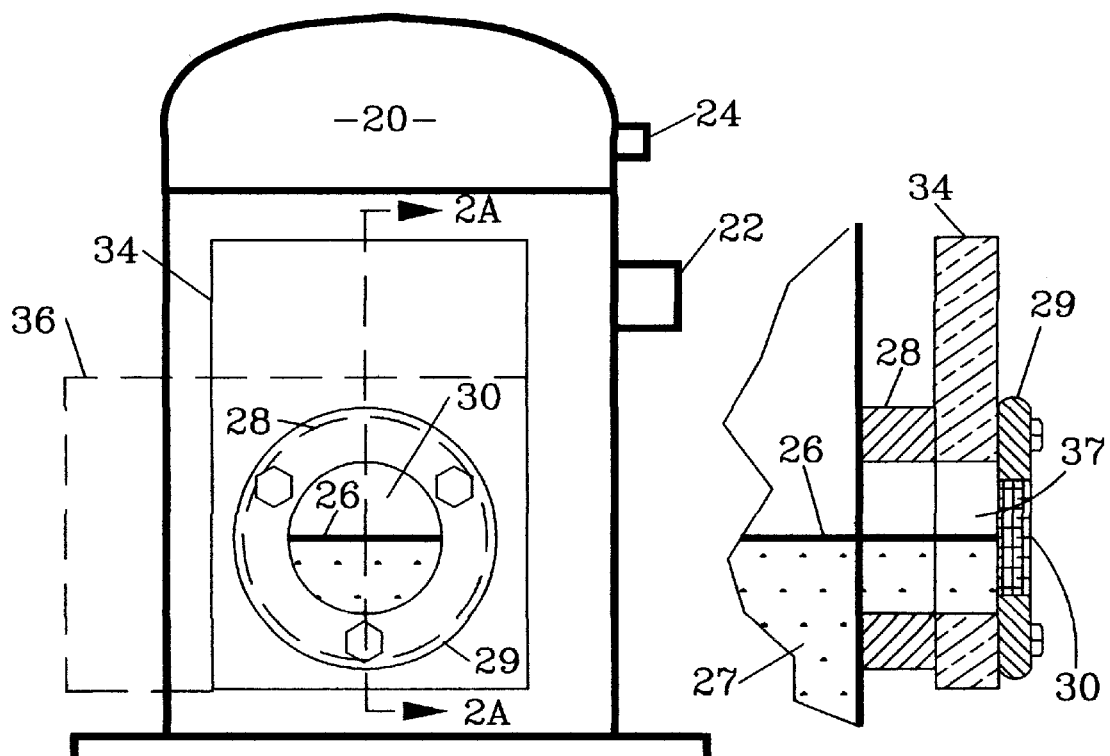
*Fig. 2*   *Fig. 2A*
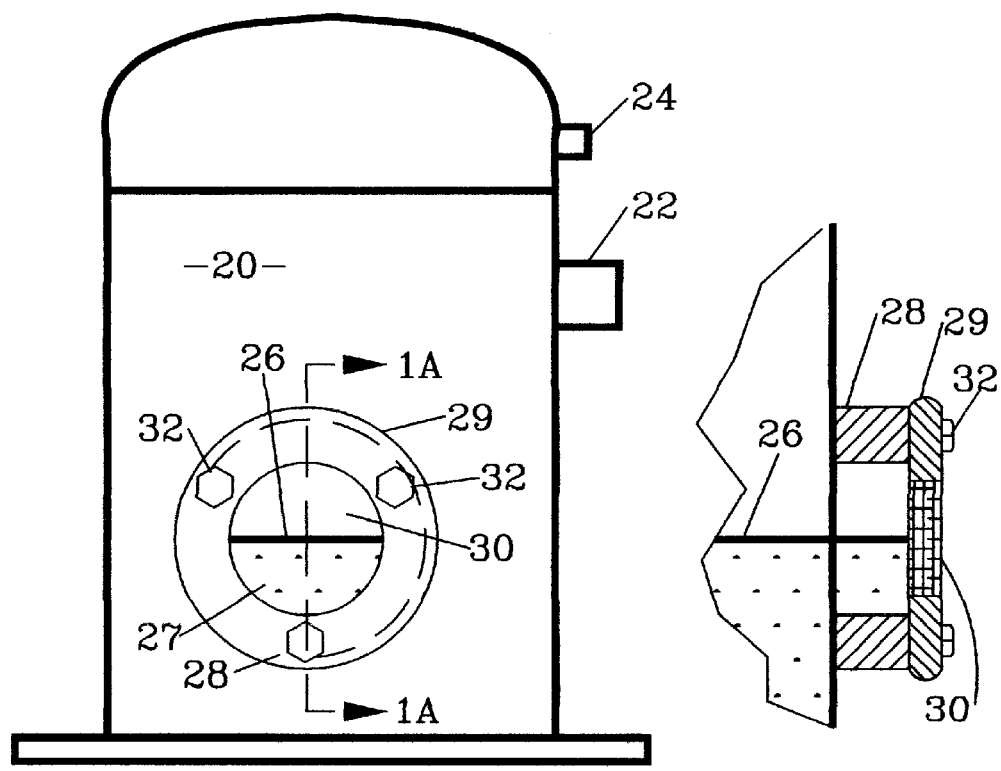
*Fig. 1*   *Fig. 1A*

NON-FOULING LIQUID LEVEL CONTROL

PRIORITY

This patent application and the inventors hereof claim priority based on the following Provisional Patent Applications Serial 60/242,206 Filed Oct. 23, 2000
Serial 60/249,316 Filed Nov. 17, 2000
Serial 60/256,255 Filed Dec. 18, 2000
Serial 60/293,792 Filed May 25, 2001

BACKGROUND OF THE INVENTION

Prior Art

A number of electronic oil level control systems for refrigeration compressors have been in use in the past. U.S. Pat. No. 5,103,648 discloses an optical system for monitoring and reacting to oil level within a compressor.

U.S. Pat. No. 6,125,642 teaches an oil level control system employing the complex permittivity of the oil compared with the permittivity of the vapor refrigerant environment.

U.S. Pat. No. 5,911,289 (Clive Waller) discloses an oil level monitoring and control systems based on the use of a float residing on the pool oil surface. The float is attached to one end of a pivoting rod. The rod bears at its other end a permanent magnet that moves in a reverse direction from the float level. The pivoting float, rod and magnet are within the refrigerant/oil circuit. At times the magnet is immersed within the oil pool. The position of the magnet is monitored external of the refrigerant/oil circuit thru a non-ferrous wall built into the device adjacent which the magnet moves. A Hall-Effect magnetic field detector is positioned external of the refrigerant/oil circuit and adjacent the magnetically permeable non-ferrous wall. As the float arm pivots, the arcuate motion of the permanent magnet adjacent the permeable wall causes the Hall-Effect device to respond the change in the strength of the magnetic field associated with the movement of the magnet and thereby activate control valves or alarm signals as required.

BACKGROUND

Problems

All these control devices and systems based on their use have exhibited control problems and false alarms generated during the oil foaming conditions frequently arising during periods of operation immediately after compressor startup or during periods of refrigerant liquid floodback into the oil pool whose level was the control objective.

New non-ozone damaging refrigerants are frequently of the hydrofluorocarbon type (HFC). The manufacturers of these HFC refrigerants require the use of a miscible lubricant such as polyester (POE). POE acts as a cleaning agent of all the sludge in the system and entrains this dirt with the POE as it returns to the compressor. Not only do the metal particles, accompanying and part of the sludge, accumulate on magnets immersed in the oil, the sludge accumulation can also affect the optical level sensing devices by fostering the formation of surface foam that fools the optical detectors. Foam also occurs when refrigerant dissolved in the oil then boils out of the oil on a sharp reduction of pressure that occurs at starting and other times. Surface foam affects both optical and wave-based sensing systems.

Operational problems with the Waller construction have been reported. These problems have been primarily caused by the weight of very fine metal and iron wear particles in the oil that are attracted to the magnet on one end of the float. As the weight of the Waller magnet gradually increases because of the accretion of the wear particles, the position of the magnet is biased downward, thereby falsely indicating a higher oil level than truly exists, thus failing to cause entry of make-up oil or failing to actuate an alarm, even when the true oil level has dropped to the danger point.

The invention disclosed herein overcomes the faults of the Waller device and the several optical based level sensors and controllers.

OBJECTS OF THE INVENTION

It is an object of the invention to provide a liquid level sensing and control device that is unaffected by magnetic and metallic particles.

It is a further object to provide such a device that does not require a magnet positioned within the liquid whose level is sensed.

It is a further object to provide such a device that employs the Hall Effect principle to detect the position of a float positioned to follow level changes of the monitored liquid and to employ as tell-tale an unmagnetized ferromagnetic tell-tale mounted on the float.

It is a further object to provide such a device that employs a float that moves in a straight-line motion in conformance with the change in the level of the monitored liquid.

It is a further object to secure the straight line float motion by providing a float whose motion is constrained by at least one substantially straight guide.

It is a further object to secure the straight line motion by employing a float whose motion is constrained by two substantially straight guides.

It is a further object to provide such straight line motion by employing substantially straight guide members that traverse the float.

It is a further object to facilitate the performance of a Hall Effect sensor by employing a magnet positioned substantially adjacent the Hall Effect sensor.

It is a further object to employ a magnet in the shape of a ring shaped to allow the Hall Effect sensor to occupy a position within the central area of the ring.

It is a further object to moderate the effect of the magnet by the use of a ferromagnetic bridge between the magnet and the working area.

It is a further object to moderate the effect of the ring magnet by employing a ferromagnetic pole-piece positioned in contact with the ring magnet.

It is a further object to moderate the effect of the magnet by employing a ring-shaped pole-piece positioned in substantial contact with the ring magnet.

It is further object to moderate the effect of the magnet by utilizing an electromagnet and moderating the current flow through its windings.

SUMMARY OF THE INVENTION

For a closed system, a level sensing and controlling device for a liquid having a rising and falling level, the device including a float of non-magnetic material, a magnetic couple comprising a magnetized part and an unmagnetized part, the float having attached thereto one part of the magnetic couple, at least one guide constraining the float and its attached part to move in a straight substantially vertical line with the rise and fall of the liquid level, a magnetically permeable partition substantially adjacent the float for separating the interior of the closed system from the exterior, a Hall Effect sensor positioned substantially adjacent the partition exterior and the other part of the couple positioned substantially adjacent the Hall Effect sensor.

BRIEF DESCRIPTION OF THE DRAWINGS

All of the embodiments disclosed include a magnetically permeable partition positioned between a magnetic or ferromagnetic tell-tale and a Hall Effect sensor.

FIG. 1 shows an outline of a hermetic compressor of the type to which the invention could be applied.

FIG. 2 shows an outline of the device enclosure mounted in two positions on a hermetic compressor.

FIG. 5 shows in several views an embodiment of the invention where a permanent magnet is mounted on top of the float as a tell-tale and the Hall Effect sensor is positioned above the float outside the sealed system or on bottom and the Hall Effect sensor is beneath the float at position 48a.

DETAILED DESCRIPTION OF THE INVENTION

General Description of the Environment

Figure 3A:
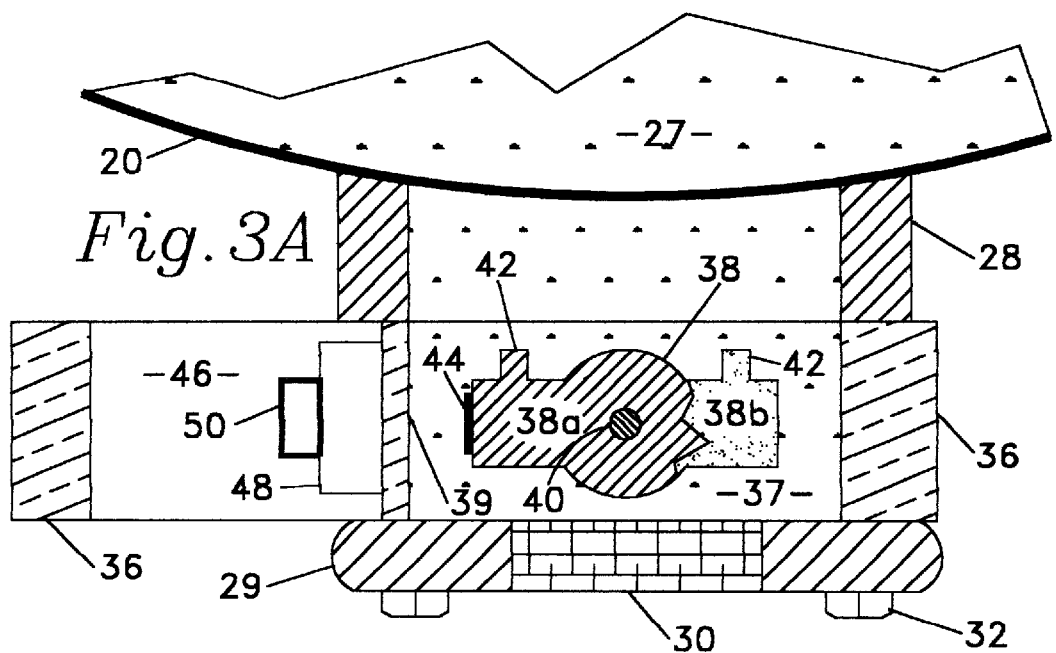
FIG. 3 shows two views of an embodiment of the invention having a tell-take side mounted on a float within the sealed system and a side-mounted sensor outside the sealed system.

While this invention was developed primarily for use in the lubricating oil sumps or reservoirs of compressors in sealed air conditioning and refrigeration systems, the device is perfectly suited for monitoring a critical liquid level within any closed or sealed environment including chemical, petroleum, pharmaceutical, aeronautical, aerospace and nuclear.

The device employs a Hall Effect part or Hall Effect sensor to detect the position of a float having a density lower than the density of the liquid monitored. The float bears a ferromagnetic tell-tale. The term ferromagnetic is employed throughout this description to mean either a ferrous but non-magnetized material capable of distorting or changing a magnetic field or a non-ferrous material or device having the capability of distorting or changing a magnetic field. The term magnet is employed to denote either a permanent magnet or an electromagnet. The float assembly includes one or more rods or guides or both for ensuring that the float traverses a substantially straight up and down path that is perpendicular to the liquid level surface and conforming to the change in oil or liquid level monitored.

The oil level controller also includes electronic switches to operate a solenoid valve positioned within an oil feed conduit for supplying additional oil to the float monitored reservoir or sump when necessary and to provide a relay output to either cause the compressor to turn off or produce an alarm. The electronic circuit can also provide time delays prior to making oil feed or compressor off decisions. The oil feed conduit, solenoid valve and electronic logic devices are shown as rudimentary elements only, since they are all well known.

A typical operating sequence is as follows:

(1) The oil level while the compressor is running is maintained between ½ and ⅓ distance of the diameter of the sightglass.

(2) When the oil level falls to ⅓ sightglass, it is detected by the oil level sensing circuit and, after a 10 second delay, the electronic circuit switches on a solenoid valve to feed oil into the compressor crankcase from a reservoir.

(3) If the oil feed causes the crankcase oil level to reach the ½ sightglass level as detected by the oil level sensing circuit, the oil will feed for 10 more seconds and the circuit will switch the solenoid valve to its closed position.

(4) If the oil feed fails to bring the crankcase oil level up to the k sightglass level in 120 seconds, thereby indicating failure of the solenoid valve or lack of oil in the reservoir, the output relay will close to cause the compressor to turn off or produce an alarm indication or both actions can be produced from a secondary relay.

While no specific circuitry is shown associated with the Hall Effect sensor to accomplish these actions, the design of such circuitry is well known and readily available from the purveyors of the Hall Effect sensor or others.

The Hall Effect was discovered by Edwin Hall in 1879. He discovered that when a conductor (or semiconductor) with current flowing in one direction was moved in a direction perpendicular to a magnetic field, a voltage was generated whose potential was at right angles to the current path. Solid state devices are widely available in the form of small packaged integrated circuits (IC) that employ the Hall Effect to actuate integral switches on movement of a magnetic field relative to the IC package.

The voltage output of the Hall Effect sensor increases as the magnetic field strength increases. As the float with its ferromagnetic tell-tale moves up, the magnetic field strength increases as the extra ferromagnetic material of the tell-tale is added to the magnetic field, thereby causing the Hall Effect sensor to increase its voltage output to the electronic circuit.

Conversely, as the float moves down, the voltage output of the Hall Effect sensor is reduced. At some preset minimum voltage, the electronic circuit energizes an oil feed solenoid valve to increase the oil level in the chamber or performs some other desired function.

While the applications illustrated for the Hall Effect (HE) device in the advertisements and application literature uniformly show the device reacting to the approach or passing of a magnet, in the application disclosed herein, the magnet is positioned in fixed relation to the Hall Effect device and the change in magnetic field is induced by motion of an unmagnetized ferromagnetic element whereby the magnetic field projected by the adjacent magnet is sufficiently distorted by the approach or passing of a non-magnetized ferromagnetic part to actuate the Hall switch. The source of magnetism could be a permanent magnet or an electromagnet.

Referring now to FIG. 1 there is shown a refrigeration compressor of the type to which the instant invention can be applied. The compressor is contained within shell 20 formed usually of welded steel sheet. The inlet gas or suction connection 22 and compressed gas or discharge connection 24 are both positioned on the side of shell 20. Within the compressor, at the bottom of shell 20 is a pool of oil 27 having a surface 26. While very small compressors of the type employed in domestic refrigerators and window air conditioner do not have any way to observe the oil level 26 within shell 20, larger compressors intended for use in built-up systems have boss 28 welded to the exterior of shell 20 and sight glass assembly 29 comprising a metal exterior and glass window 30 fused to the metal exterior. The assembly 29 is held in place against boss 28 by bolts 32 with an intermediate gasket or O-ring (not shown) to prevent leakage.

FIG. 1A is a cross-section of a portion of compressor shell 20, boss 28 and sightglass 29, illustrating the relationship of the parts to the compressor shell and the oil pool 27 and oil level 29.

Referring now to FIGS. 2 and 2A, there is shown in FIG. 2 a front view of the compressor which appears the same as that of FIG. 1, except there is shown an outline of vertical enclosure 34 that is constructed and arranged to hold and secure parts of the invention, whereby the level 26 of oil pool 27 is monitored and if necessary, an electric signal sent to a valve (not shown) to open and supply oil to the pool, when needed, or to ring an alarm or even to open an valve to allow an excess quantity of oil to be removed from pool 27. Vertical enclosure 34 is directed to the constructions of FIGS. 4, 5, 6 and 7 where a ferromagnetic part is positioned above the oil level and above the top of the float and the Hall Effect sensor is positioned above the float. The orientation of enclosure 36 is directed to the construction of FIG. 3 where the Hall Effect sensor is positioned immediately horizontally adjacent the oil level 26 and positioned to detect motion of a ferromagnetic part positioned on the float at or near the oil level.

Referring to FIG. 2A there is shown a cross-section 2A—2A of the construction of FIG. 2 wherein is shown space 37 in which the operative parts of the float mechanism are positioned. The mechanical installation procedure of enclosure 34 or 36 involves (after removal of the refrigerant charge, simply removing sight glass assembly 29, positioning the invention-containing enclosure 34 or 36 over boss 28 and reinstalling sight glass 29, with longer bolts, if necessary.

Figure 3:
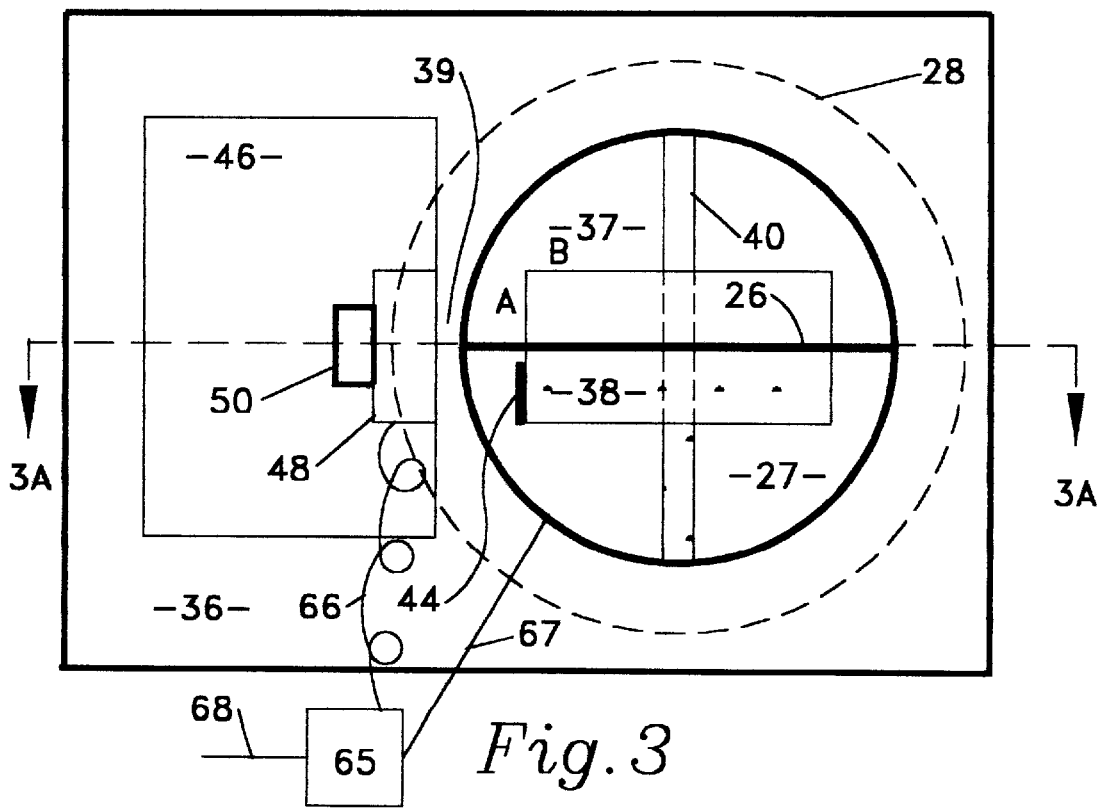

FIG. 3 provides a side view (horizontal elevation) of enclosure 36 positioned in place on compressor boss 28. Sight glass 29 which is shown in FIG. 3A has been removed in FIG. 3 for improved clarity. It must be noted that the oil 27, the float 38 and other interior parts are all positioned within a sealed system containing a pressurized refrigerant such as hydrochlorofluorocarbon HCFC-22 or hydrofluorocarbon blend R-410A and the omission of sightglass in this view is for clarity only. The interior of boss 28 and enclosure 34 or 36 encloses space 37 above oil pool 27 with oil level 26 defined as the surface of the oil pool 27. Floating in oil pool 27 is float 38. Float 38 is constructed to have an average density less than the density of the oil 27 so that it will float on the oil. In the disclosed embodiment the floatation part of the float or float material is formed of solid polyethylene or polypropylene 'plastic' having specific gravities in the range of 0.90 to 0.92. Methyl pentene copolymer, offered under the tradename TPX, has a lower specific gravity, in the range of 0.83 and provides a solid float material more suitable for less dense lubricants such as alkyl benzene that are widely employed in close coupled systems with some hydrofluorocarbon refrigerants such as R134a or R-410A. While foamed plastics can offer even lower densities, the higher pressures exhibited by some modern refrigerants suggest that simple foamed float construction may have short service life. Further, hollow floats assembled of metals such as steel or stainless steel and formed into a hollow structure shaped to fit and allow the desired motion within the allowed space may work satisfactorily, they are costly to manufacture and exhibit the risk of failure by implosion or leaking. Molded plastics have the additional advantage of being able to be readily formed into more complex shapes to fit into space restricted environments. Molded foamed graphite is also a suitable float material.

To better insure properly low density of float without prejudicing its physical integrity under high pressures, two internal constructions are shown in FIG. 3A. There, the cross-section of float 38 has been divided into portions 38a and 38b where 38a exhibits a float having a uniform homogeneous interior and 38b exhibits an internal construction formed of a mixture or composite of moldable plastic having the same composition as in 38a plus embedded particles of one or more low density solid materials such as exploded silica, foamed glass or glass spheres or glass micro spheres.

Float 38 has a substantially straight line motion following vertically positioned guide rod 40 that traverses float 38. Positioned on and fastened to the side of float 38 is ferromagnetic part 44. While the part 44 is positioned below the oil level, in other embodiments of the invention the part 44 is positioned on the side of float 38 but above the oil level 26 at position A or even on top of the float 38 at positioned B. It should be clearly emphasized that the ferromagnetic part 44 is not magnetized and therefore is incapable of attracting any particles of materials that may be entrained within oil pool 27 or floating on surface 26. Such particles being of types or materials that might or would be attracted to iron magnets or electromagnets or magnets of other types.

Hall Effect sensor 48 is positioned in apparatus chamber 46 that is outside the sealed pressurized system but within enclosure 36. The Hall Effect sensor is located and secured within equipment chamber 46, approximately at the normal oil level 26, and on or adjacent to the magnetically permeable partition 39 that serves to isolate the contents of the sealed system from the Hall Effect sensor and from the outside atmosphere and the equipment chamber 46. Slight positional deviations of the Hall Effect sensor may be necessary to comport with expected oil level ranges and Hall Effect device sensitivities and other variables. Positioned 'atop' Hall Effect sensor 48 is a magnet 50. Atop in this context means that the magnet is positioned so that the Hall Effect sensor is between the magnet and the tell-tale 44. While magnet 50 is shown positioned in direct contact with Hall Effect sensor 48, a spacer or other means may be employed to move the magnet away from Hall Effect sensor 48 in order to adjust the sensitivity of the combination to provide desired response of the Hall Effect sensor to motion of ferromagnetic tell-tale 44 and to adjust for initial variations in the magnetic strength of magnet 50.

The soft ferromagnetic tell-tale 44 does not hold permanent magnetism but affects the reluctance of a magnetic field. As the float changes position with a change in oil level, the tell-tale 44 positioned on the float alters the magnetic field sensed by the Hall Effect sensor and changes its electronic signal output, thereby allowing the associated switches or actuate or stop the desired activity. Solenoid valve 65 is connected to a reservoir of oil, via conduit 68 and to the body of oil 27 by conduit 67. Solenoid valve 65 is actuated by a connection 66 between it and Hall Effect sensor 48.

In another embodiment of the invention, magnet 50 is an electromagnet and is activated by a direct current. In an embodiment of this construction, provisions are provided for periodically stopping the flow of electric current to the electromagnet. The advantage of this construction is that when the current is turned off the magnet is deenergized, its magnetic field collapses and any magnetic particles that might have been attracted to the interior of magnetically permeable partition 39, drop to the bottom of the oil pool 27 where they are unlikely to do harm, by contrast with their harmful potential while circulating with the oil. In another embodiment, means are provided for periodically reversing the flow of direct current to the electromagnet.

FIG. 3A is a section of FIG. 3 along section line 3A—3A. This top view of float 38 teaches that it is formed with a substantially cylindrical portion having a centrally located hole within which guide rod 40 is positioned. Guide bars 42 are molded into float 38 and serve to keep the float and ferromagnetic tell-tale aligned with the Hall Effect sensor assembly that is positioned within equipment chamber 46 on the unpressurized side of magnetically permeable wall 39. FIG. 3A displays sight glass assembly 29 (omitted from FIG. 3) in its proper position.

While the usual function of an Hall Effect sensor is to respond to changes in the location of a moving magnet, in this embodiment the magnet is positioned in fixed relationship to the Hall Effect sensor and the actuation of the Hall Effect sensor is secured through movement of the unmagnetized tell-tale ferromagnetic part 44, mounted to and moving with float 38. The Hall Effect device 48 is caused to respond, not by motion of the fixed magnet 50 with respect to the Hall Effect sensor but by changes in distortion of the magnetic field affecting the Hall Effect sensor by movement of non-magnetized ferromagnetic tell-tale 44 within the magnetic field generated by magnet 50. The great advantage of such an arrangement is that the magnet is outside the sealed system. Therefore any magnetic particles that might collect on the interior surface of partition 39 within float chamber 37, cannot bias the movement of float 38 in any way. Such bias has been a major fault of prior art devices that teach the location of the magnet on or in weight relationship with the float. In that construction accumulation of iron particles on the magnet bias it in a direction causing erroneous response of the Hall Effect sensor to liquid level.

Figure 4A:
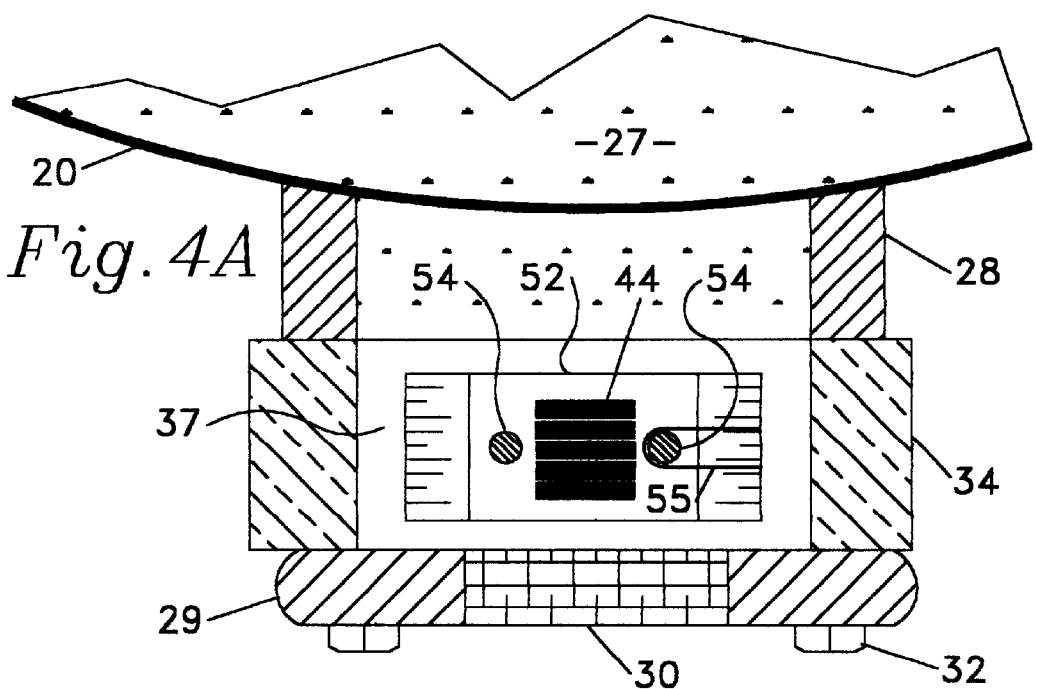
FIG. 4 shows two views of one version of a preferred embodiment having a float with a top mounted ferromagnetic tell-tale sensing a level within the system and a Hall Effect sensor positioned outside the system positioned above the tell-tale.
Figure 4:
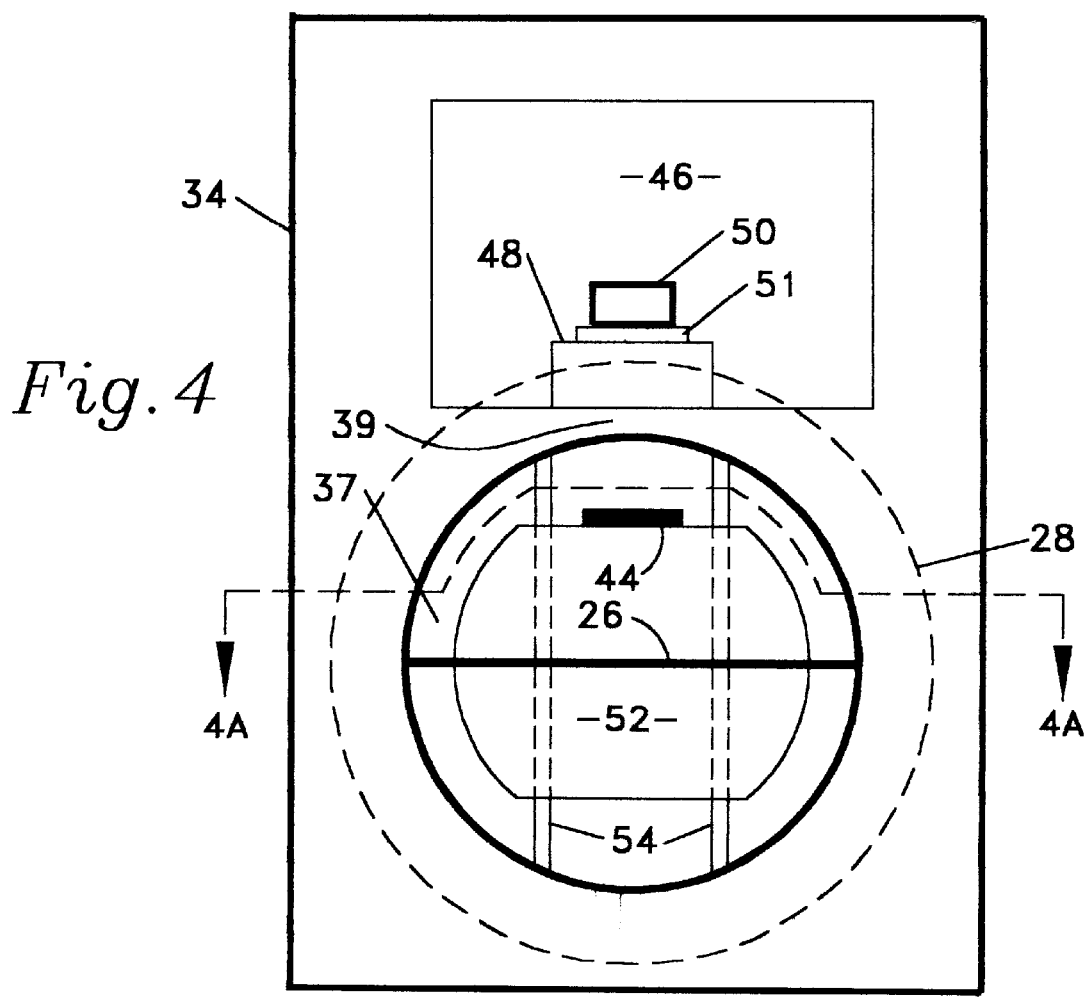

In FIG. 4 there is shown a side elevation of oil sight glass boss 20 that is part of compressor shell 20. Sight glass 29, whose position relative to the assembly is shown in FIG. 4A, has been omitted from FIG. 4 for clarity. Also, the hatch signifying the presence of oil pool 27 has been omitted from the float chambers in FIGS. 4 and 4A for clarity, though it must be understood that the pool of oil 27 resides below the indicated oil level 26. Float and electronics enclosure 34, having vertical format, and showing electronics chamber 46 and float chamber 37 is shown positioned on boss 28. Hall Effect sensor 48 is positioned above float chamber 37 and is separated from it by magnetically permeable partition 39. Magnet 50 is positioned on the opposite side of Hall Effect sensor 48 from wall 39. Magnet 50 is separated or spaced from Hall Effect sensor 48 by spacer 51. Typically, spacer 51 is formed of a magnetically permeable material whose thickness is selected to provide a magnetic field whose structure or intensity will be most effectively changed by the approach or recession of tell-tale 44 with respect to Hall Effect sensor 48. Within float chamber 37 is positioned float 52 having a truncated circular shape in this frontal view. The circular shape is modified by planar truncations at top and bottom parallel chords. Float 52 rides on and is guided into a substantially straight vertical motion by two guide rods 54. A ferromagnetic tell-tale 44 is positioned on and fastened to the top planar chordal surface of float 52 where an up or down motion of float 52 causes tell-tale 44 to approach or recede from magnetically permeable partition 39, on the other side of which is positioned Hall Effect sensor 48. Magnet 50 is positioned outside the pressurized compartment and within chamber 37. Magnet 50 is secured on the opposite side of Hall Effect sensor 48 from partition 39 and from tell-tale 44 positioned on float 52. As float 52 rises and falls, ferromagnetic tell-tale 44 distorts the magnetic field surrounding magnet 50 and extending into float chamber 37, thereby affecting the intensity of the magnetic field traversing Hall Effect sensor 48 and causing it to actuate a solid state or mechanical switch at a position in the float's travel that can be determined by test. A adjustment of the 'trippoint' for actuation of a switch is secured by moving magnet 50 and/or Hall Effect sensor 48 away from or closer to partition 39. One these positions are determined, they are mechanically fixed. The positions of Hall Effect sensor 48 and magnet 50 are intended to be initially adjusted by the manufacturer to provide correct operation. Therefore, depiction in the drawings of those elements always in contact with partition 39 is not intended to be determining. It should be noted that the magnetically permeably partition 39 could be positioned substantially parallel with the level 26 but underneath the float in contact with the liquid 27. In that case the tell-tale 44 would be positioned at 44b (FIG. 7) and Hall Effect sensor 48 would be at the bottom of the boss 28. Under certain operating conditions where the liquid surface at level 26 is highly agitated or subject to foaming, the sensitivity of sensor 48 to motion of the tell-tale 44 or 44b would be increased, since the condition of the fluid between the tell-tale 44 and the magnetically permeable partition 39 would remain substantially constant.

Non-straight sectional line 4A—4A in FIG. 4 is positioned to allow the simplest and clearest view of the construction of the assembly in FIG. 4A.

Referring now to FIG. 4A there is shown compressor shell 20 with oil sight glass boss 28 attached thereto. Sightglass 29 has been temporarily removed and enclosure 34 positioned and sight glass assembly 29 replaced and bolted securely to boss 28, thereby providing float chamber 37 in direct communication with the interior of compressor shell 20 and the oil pool 27 residing therein. Guide holes within float 52 for accommodating guide pin 54 in other embodiments are replaced by grooves 55 formed in the sides of float 52 thereby simplifying the molding process.

Figure 5A:
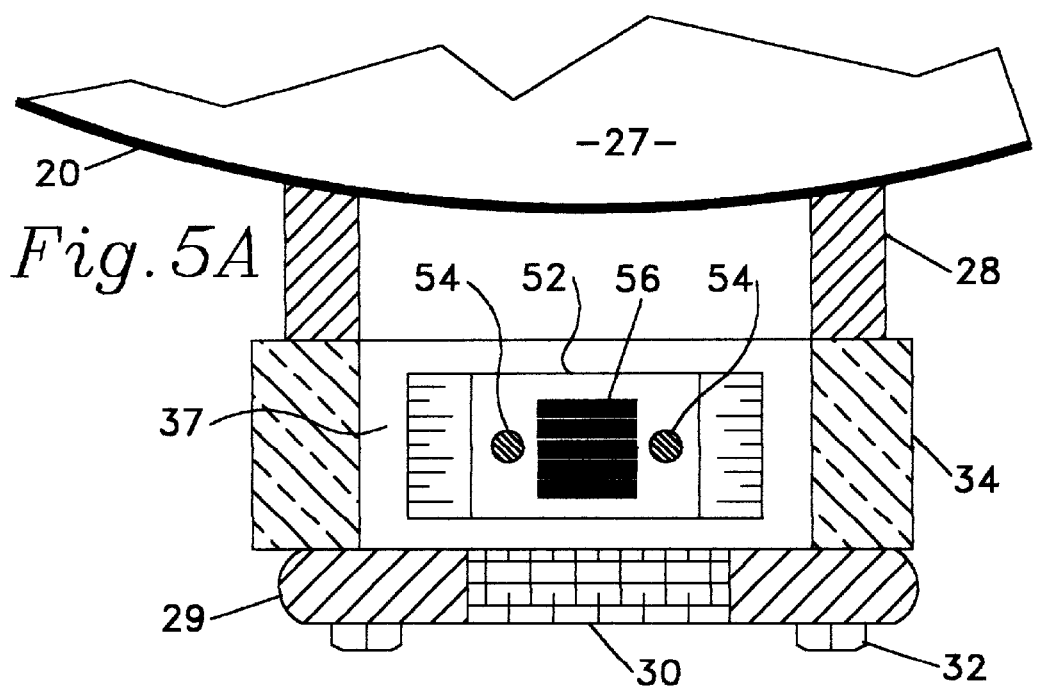
Figure 5:
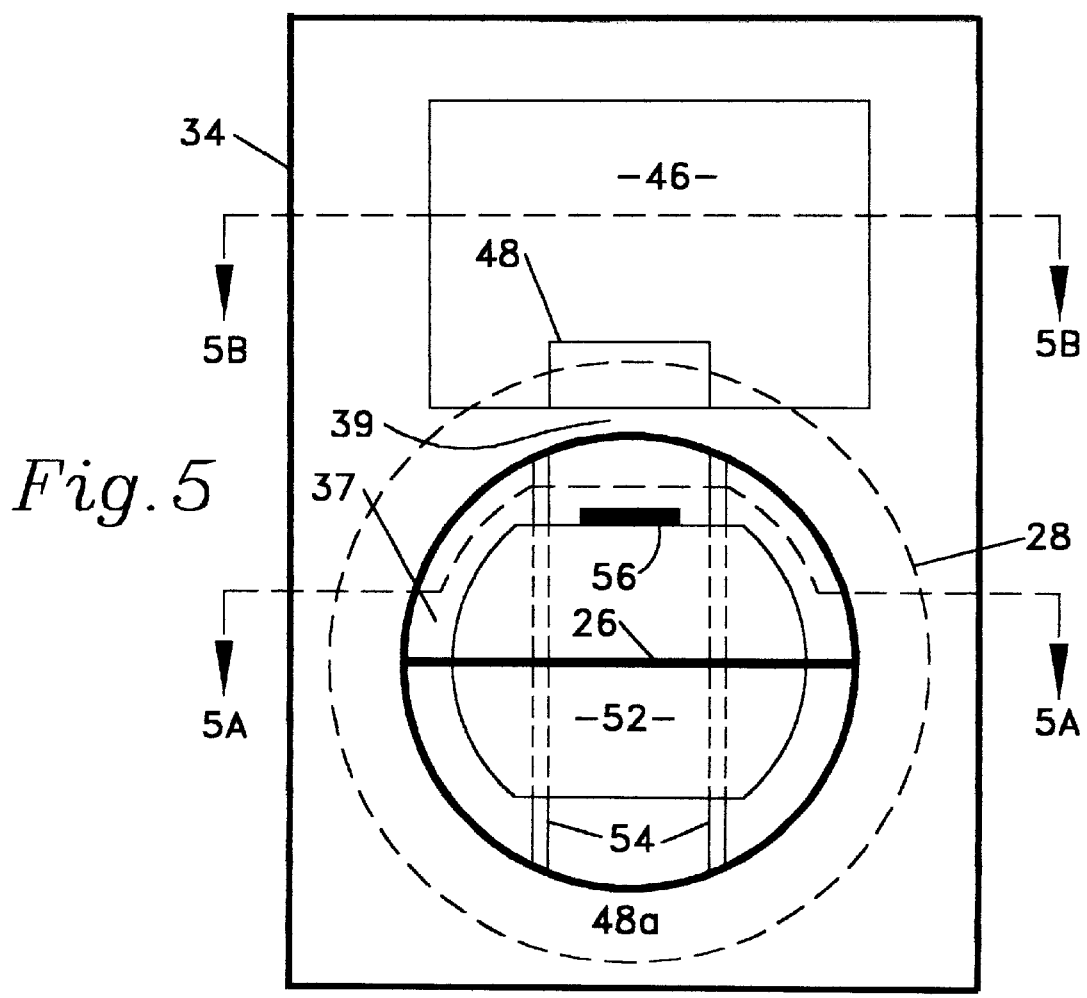
Figure 5B:
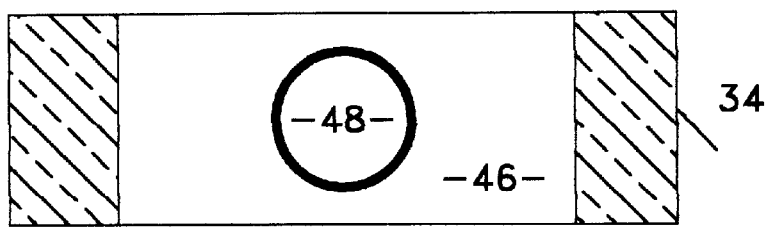

FIGS. 5 and 5A are substantially similar to FIGS. 4 and 4A described above, with the exception that tell-tale 56, that is secured to the upper planar chordal surface of float 52, is a permanent magnet. Permanent magnet 56 approaches and recedes from Hall Effect sensor 48 as float 52 rises and falls with the level 26 of oil pool 27, thereby changing the intensity of the magnetic field traversing Hall Effect sensor 48 and causing the Hall Effect sensor 48 to open or close an electrical circuit in response thereto. In an alternate embodiment Hall Effect sensor is positioned at 48a beneath the float. FIG. 5B simply shows, in a plan cross-section 5B—5B, the Hall Effect sensor positioned within compartment 46.

Figure 6A:
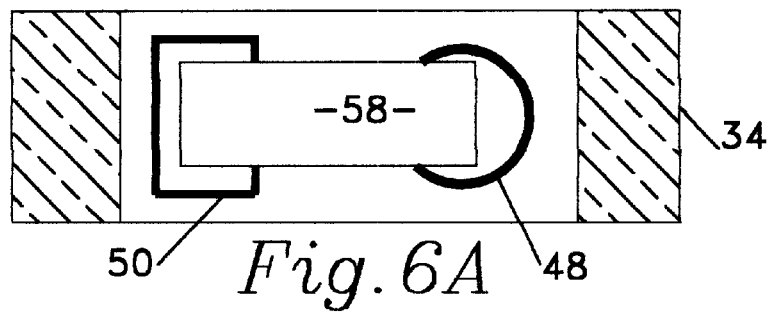
FIG. 6 shows a modification of the embodiment of FIG. 4 where magnet is outside the sealed circuit and a ferromagnetic bridge is employed to refine and adjust the effect of the permanent magnet on the float-mounted tell-tale.
Figure 6:
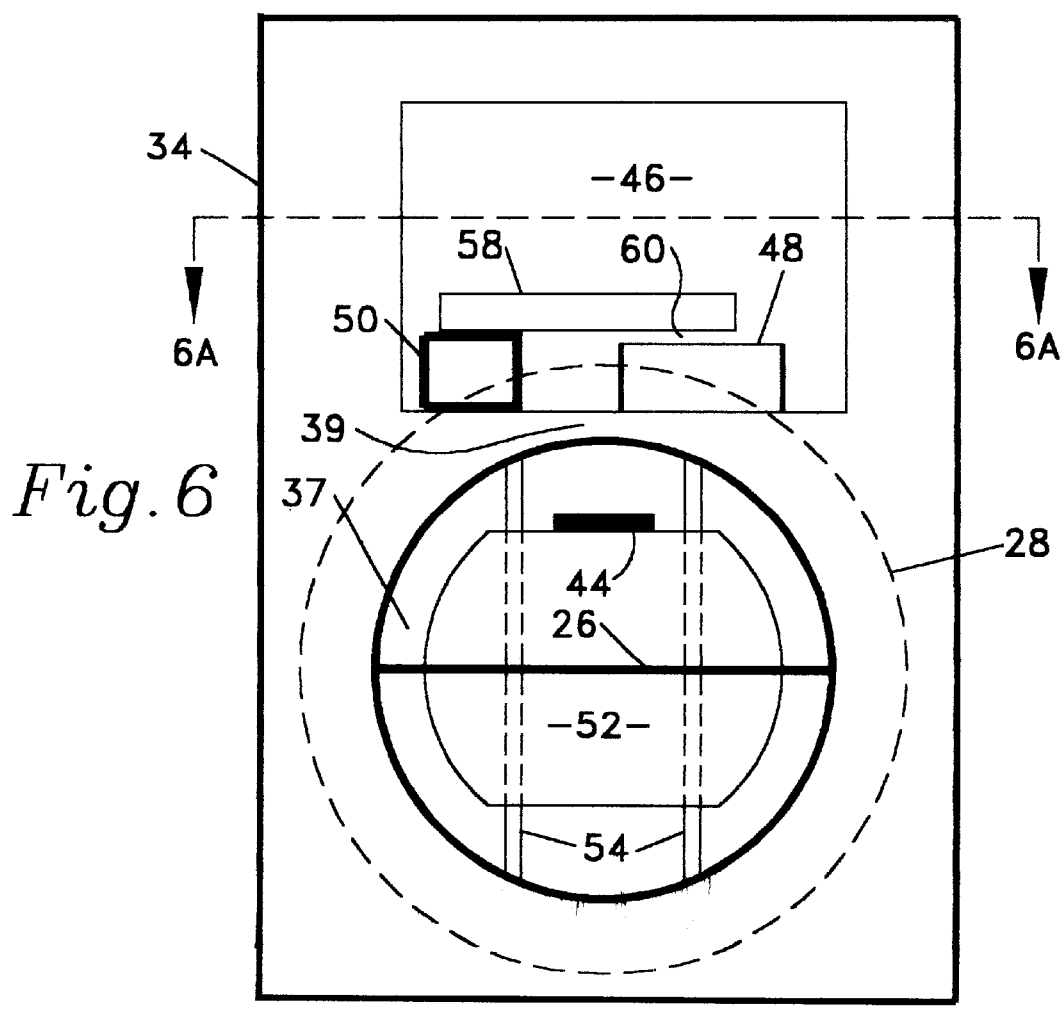

In FIG. 6 there is shown a float assembly substantially the same as that shown and described in FIG. 4. However, in FIGS. 6 and 6A, Hall Effect sensor 48 is shown positioned slightly off-center of the vertical axis of float 52 and permanent magnet 50 is positioned alongside the Hall Effect sensor but spaced from it. Magnetic bridge 58 is formed of a ferromagnetic material and is positioned on magnet 50 and extending wholly or partly over Hall Effect sensor 48 to provide an extension of the magnetic field generated by magnet 50, over the Hall Effect sensor 48. The thickness and positioning of Hall Effect sensor 48 and magnet 50 and magnetic bridge 58 must be adjusted to secure the most effective reaction of Hall Effect sensor 48 to movement of ferromagnetic telltale 44.

Figure 7A:
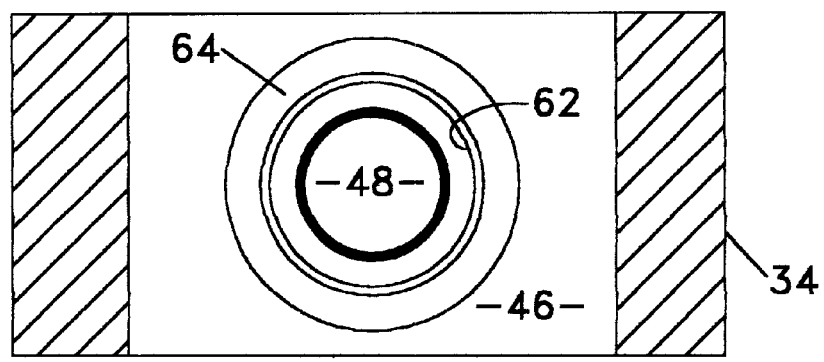
FIG. 7 illustrates an embodiment of the invention employing a ring shaped magnet positioned above and outside the sealed system and a ferromagnetic ring-shaped magnetobridge provided to control the effect of the permanent magnet.
Figure 7:
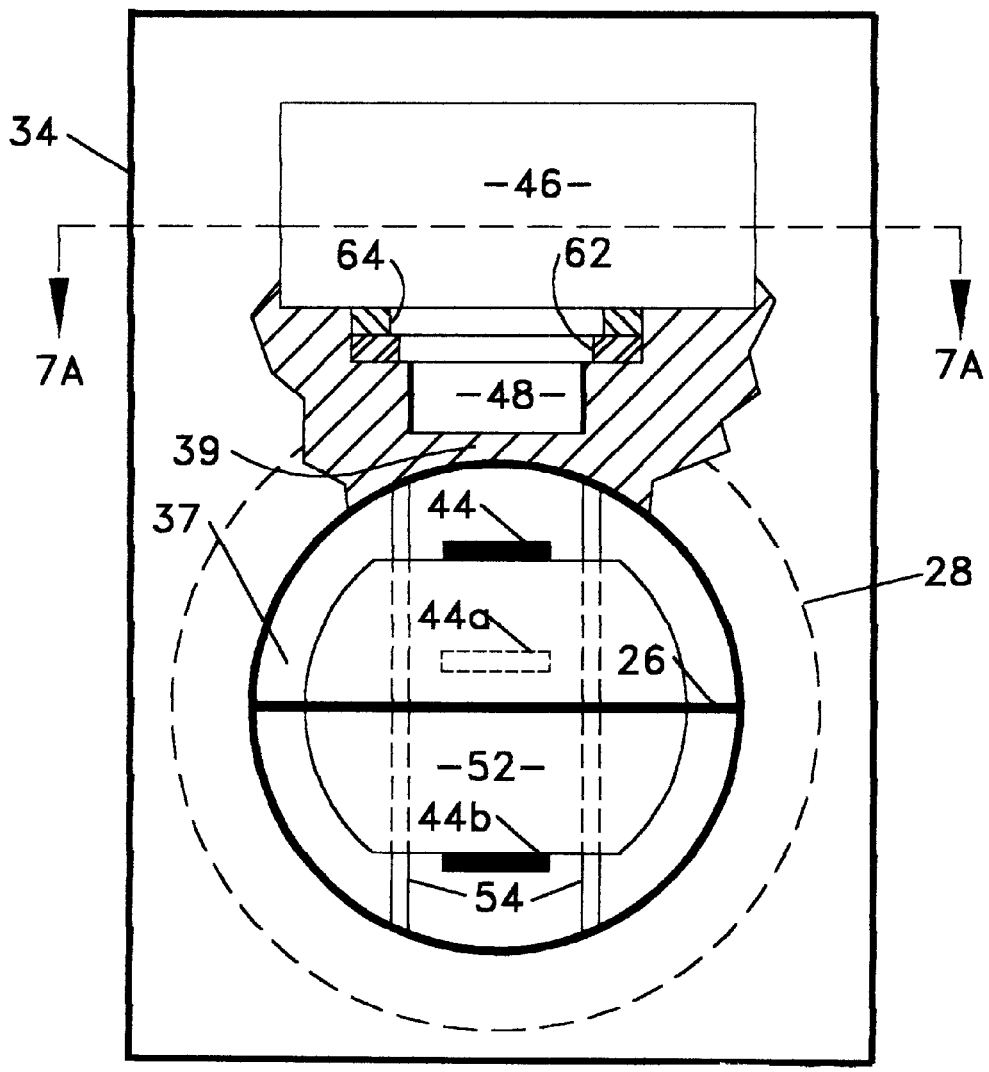

FIG. 7 shows a float 52 and ferromagnetic tell-tale 44 mounted on the float that is substantially identical to those shown and described in FIGS. 4 and 6. It should be noted that, while the position of tell-tale 44 or 56 has been shown and described having a position on top of float 52, other positions 44a and 44b for the tell-tale are also effective and, in certain case or environments desirable. In position 44a, the tell-tale is embedded within float 52, thereby providing the tell-tale protection against corrosion by the oil or fluid. In position 44b the telltale is positioned on and attached to the bottom of float 52, thereby providing a greater distance between Hall Effect sensor 48 and the tell-tale.

Referring now to both FIGS. 7 and 7A, apparatus chamber 46 has been modified by providing a cylindrical chamber for Hall Effect sensor 48. The chamber and the Hall Effect sensor 48 are positioned adjacent magnetically permeable partition 39. A second cylindrical chamber, coaxial with the cylindrical chamber holding Hall Effect sensor 48, is formed above the sensor chamber. Within the second chamber are positioned ferromagnetic ring 62 and, substantially adjacent ring 62 and further from he sensor 48 is positioned ring magnet 64. Ferromagnetic ring 62 provides a moderating influence on the magnetic field generated by ring magnet 64, thereby providing a magnetic field that is sharply affected by motion of the tell-tale 44, 44a or 44b towards or away from Hall Effect sensor 48, thereby providing an effective measure of the position of float 52 and oil level 26.

It should be noted that the term ferromagnetic must also be applicable to non ferrous materials such a certain ceramics that have magnetic or ferromagnetic qualities and to materials such as Cobalt, Nickel and to alloys and ceramics containing these materials as metals, oxides or in organic and inorganic compositions that exhibit the characteristic of changing or distorting a magnetic field within which these materials are positioned.

As used herein, density is the mass of a substance per unit volume of that substance; specific gravity of a substance is the density of that substance divided by the density of water at defined conditions. Average density of a construct is the mass of the construct divided by its volume.

From the foregoing description, it can be seen that the present invention comprises an advanced level detection and control assembly for liquids or oils within a pressurized environment. It will be appreciated by those skilled in the art that changes could be made to the embodiments described in the foregoing description without departing from the broad inventive concept thereof. It is understood, therefore, that this invention is not limited to the particular embodiment or embodiments disclosed, but is intended to cover all modifications which are within the scope and spirit of the invention as defined by the appended claims, as well as by each of the elements enumerated and equivalents thereof.

We claim:

1. A level control device for liquid having a density, the liquid having a changeable level and a surface corresponding to the level, an enclosure having an inside and an outside, the liquid being contained inside the enclosure, a magnetically permeable partition separating the enclosure inside from the enclosure outside, said device further comprising:

float means for moving in response to a change in liquid level, guide means for causing the float to move in a straight line path substantially perpendicular to the liquid surface, magnet means for establishing a magnetic field, said magnet means being positioned outside the enclosure, means associated with the float means for affecting the magnetic field, magnetic field sensor means employing a Hall Effect for responding to the magnetic field as affected by the float means, said magnetic field sensor means being positioned outside the enclosure, and further providing that said magnetic field sensor means is positioned substantially adjacent said permeable partition and the magnet means is positioned substantially adjacent said magnetic field sensor means, but spaced from said partition.

2. A liquid level control device as recited in claim 1 further providing that the magnet means, while substantially adjacent the magnetic field sensor means, is spaced from said magnetic field sensor means.

3. A liquid level control device as recited in claim 2 where there is a magnetically permeable spacer between the magnet means and the magnetic field sensor means.

4. A liquid level control device as recited in claim 2 where there is a ferromagnetic spacer between the magnet means and the magnetic field sensor means.

5. A level control device for liquid having a density, the liquid being contained within an enclosure interior, the liquid having a changeable level and a surface corresponding to the level, said device comprising:

magnet means positioned outside the enclosure for establishing a magnetic field, float means for moving in response to a change in liquid level and unmagnetized means associated with the float means for affecting the magnetic field, guide means for causing the float to move in a straight line path substantially perpendicular to the liquid surface, and magnetic field sensor means positioned outside the enclosure for responding to the magnetic field as affected by the float means.

6. A liquid level control device as recited in claim 5 and further providing a magnetically permeable partition separating the magnetic field sensor means from the enclosure interior.

7. A liquid level control device as recited in claim 6 further providing that the magnetically permeable partition is substantially parallel to the liquid surface.

8. A liquid level control device as recited in claim 7 where the liquid surface interfaces with vapor above the surface and where the partition is in contact with the vapor.

9. A liquid level control device as recited in claim 7 where the partition is in contact with the liquid.

10. A liquid level control device as recited in claim 7 and further providing Hall Effect magnetic field sensor means and that said magnet means and said magnetic field sensor means are both positioned on a single planar surface that is substantially parallel to the liquid surface, and that said magnetic field sensor means and said magnet means are separated by a distance.

11. A liquid level control device as recited in claim 10, further providing a ferromagnetic bridge positioned in contact with said magnet means and extending towards, but separated from, said magnetic field sensor means.

12. A liquid level control device as recited in claim 7, further providing a substantially cylindrical first cavity within the permeable partition within which first cavity said magnetic field sensor means is positioned, the first cavity having a diameter and a central axis substantially perpendicular to the liquid surface, and a second cavity coaxial with the first cavity and substantially adjacent to the first cavity, said second cavity having a larger diameter than said first cavity and further providing magnet means comprising a ring magnet positioned within said second cavity.

13. A liquid level control device as recited in claim 12, further providing a ferromagnetic ring positioned in the second cavity between the ring magnet and the sensor.

14. A level control device for liquid having a density, the liquid being contained within an enclosure interior, the liquid having a changeable level and a surface corresponding to the level, said device comprising magnet means for establishing a magnetic field, float means for moving in response to a change in liquid level and means associated with the float means for affecting the magnetic field, further providing that the float means comprises methyl pentene copolymer float material and associated magnetic field affecting means and that the float means has an average density less than the density of the liquid, guide means for causing the float to move in a straight line path substantially perpendicular to the liquid surface, and magnetic field sensor means positioned outside the enclosure for responding to the magnetic field as affected by the float means.

15. A level control device for liquid having a density, the liquid being contained within an enclosure interior, the liquid having a changeable level, a surface corresponding to the level, said device comprising:

magnet means for establishing a magnetic field, float means for moving in response to a change in liquid level, said float means comprising float material and means associated with the float means for affecting the magnetic field, and further providing that the float means has an average density less than the density of the liquid and further providing that said float material comprises matrix means for providing an average float means density lower than the liquid density, said matrix means comprising moldable plastic material having a density greater than the liquid and material of a lower density embedded therein, whereby the average density of the float means is lower than the liquid density, and guide means for causing the float means to move in a straight line path substantially perpendicular to the liquid surface, and magnetic field sensor means positioned outside the enclosure for responding to the magnetic field as affected by the float means.

16. A level control device for liquid as recited in claim 15, further providing that the material of lower density embedded in the plastic is hollow glass microspheres.

17. A level control device as recited in claim 15 where the embedded material of lower density is a gas.

18. A level control device as recited in claim 14 further providing that the float material is in the form of a matrix comprising methyl pentene copolymer with embedded glass microspheres.

19. A level control device for liquid having a density, the liquid being contained within an enclosure interior, the liquid having a changeable level and a surface corresponding to the level, said device comprising:

magnet means for establishing a magnetic field, float means for moving in response to a change in liquid level and means associated with the float means for affecting the magnetic field, further providing that the float means comprises methyl pentene copolymer float material and associated magnetic field affecting means and that the float means has an average density less than the density of the liquid, and magnetic field sensor means positioned outside the enclosure for responding to the magnetic field as affected by the float means.

20. A level control device as recited in claim 19 further providing that the float material is in the form of a matrix comprising methyl pentene copolymer with embedded glass microspheres.

21. A level control device for liquid having a density, the liquid being contained within an enclosure interior, the liquid having a changeable level and a surface corresponding to the level, said device comprising:

magnetically permeable partition means for separating the enclosure interior from the enclosure outside, magnet means for establishing a magnetic field, said magnet means being positioned outside the enclosure, float means for moving in response to a change in liquid level and unmagnetized ferromagnetic means associated with the float means for affecting said magnetic field, and Hall Effect sensor means for responding to the magnetic field as affected by the float means, said Hall Effect means being positioned outside the enclosure.

22. A level control device as recited in claim 21, further providing that the unmagnetized ferromagnetic means associated with the float means for affecting the magnetic field includes material selected from the group consisting of iron, cobalt, nickel and alloys or ceramics thereof.

23. A level control device as recited in claim 21 further providing that said magnet means is positioned outside the enclosure and above said float means.

24. A level control device as recited in claim 23 where said Hall Effect magnetic field sensor means is positioned outside the enclosure and above said float means.

* * * * *